(12) United States Patent
Drake et al.

(10) Patent No.: US 7,439,201 B2
(45) Date of Patent: Oct. 21, 2008

(54) LEAD-FREE FRITS FOR PLASMA DISPLAYS AND OTHER GLASS DEVICES UTILIZING GLASS SEALING MATERIALS

(75) Inventors: Melinda Ann Drake, Corning, NY (US); Sasha Marjanovic, Painted Post, NY (US); Lisa A. Lamberson, Painted Post, NY (US); Robert Michael Morena, Lindley, NY (US)

(73) Assignee: Corning Incorporation, Corning, NY (US)

( * ) Notice: Subject to any disclaimer, the term of this patent is extended or adjusted under 35 U.S.C. 154(b) by 137 days.

(21) Appl. No.: 11/511,642

(22) Filed: Aug. 29, 2006

(65) Prior Publication Data

US 2008/0058193 A1 Mar. 6, 2008

(51) Int. Cl.
*C03C 8/24* (2006.01)
*C03C 8/04* (2006.01)
*C03C 8/08* (2006.01)

(52) U.S. Cl. .............................. 501/15; 501/17; 501/26; 501/45; 501/47; 501/48; 501/24

(58) Field of Classification Search ................... 501/15, 501/17, 32, 45, 47, 48, 26, 24
See application file for complete search history.

(56) References Cited

U.S. PATENT DOCUMENTS

| | | | |
|---|---|---|---|
| 4,748,137 A | 5/1988 | Nigrin | 501/46 |
| 5,122,484 A | 6/1992 | Beall et al. | |
| 5,246,890 A | 9/1993 | Aitken et al. | 501/15 |
| 5,281,560 A | 1/1994 | Francis et al. | 501/15 |
| 5,714,840 A * | 2/1998 | Tanabe et al. | 313/581 |
| 6,048,811 A * | 4/2000 | Morena | 501/15 |
| 6,306,783 B1 | 10/2001 | Yamanaka | |
| 6,617,269 B2 | 9/2003 | Yamanaka | 501/24 |
| 6,989,340 B2 | 1/2006 | Masuda | 501/45 |
| 7,148,165 B2 * | 12/2006 | Masuda | 501/45 |

FOREIGN PATENT DOCUMENTS

| JP | 11171589 | * | 6/1999 |
|---|---|---|---|
| JP | 2001048579 | * | 2/2001 |

OTHER PUBLICATIONS

Wen, et al "*Chemical Resistance of Non-Lead Phosphate Sealing Glass*" American Ceramic Society Bulletin, et. al., vol. 85, No. 7, pp. 9201-9207, no date.

Kwon, et al "*Plasma display panel vacuum in-line sealing technology by using a bubble-reduced frit,* " J. Vac. Sci. Technol. A21 (1) Jan./Feb. 2003 pp. 206-211.

Hoornstra, et al "*lead Free metallization Paste for crystalline Silicon Solar Cells: From Model To Results,* " 31 IEEE PVSC conference Orlando, Florida, Jan. 2005.

\* cited by examiner

*Primary Examiner*—Karl E Group
(74) *Attorney, Agent, or Firm*—Walter M. Douglas

(57) ABSTRACT

The invention is directed to lead-free glass frit compositions that can be used as sealing frits, the compositions being a blend of: (1) at least one of two glass families which are $SnO$—$ZnO$—$P_2O_5$ and alkali-$ZnO$—$P_2O_5$ glasses; and (2) at least one cerammed filler material having a crystalline phase selected from the group consisting of beta-quartz, beta-eucryptite, cordierite, and beta-spodumene. The blends of the invention have flow characteristics that enable them to be used at sealing temperatures in the range of 450-550° C., and a CTE value in the range of $60$-$90 \times 10^{-7}$/° C.

11 Claims, 4 Drawing Sheets

B1　　　　　　　　　B2　　　　　　　　　B3

B1　　　　　　　　　B2　　　　　　　　　B3

LEAD-FREE FRITS FOR PLASMA DISPLAYS AND OTHER GLASS DEVICES UTILIZING GLASS SEALING MATERIALS

FIELD OF THE INVENTION

The invention is directed to lead free (Pb-free) frits that can be used for plasma display screen devices and other sealed assemblies requiring the use of lead-free glass or glass-ceramic sealing materials.

BACKGROUND OF THE INVENTION

As a result of environmental laws, waste disposal regulations, economic forces and other factors, considerable research is being conducted in the United States, Europe, Japan and elsewhere in the world to remove substances, particularly heavy metals such as lead, cadmium and mercury, from many products. For example, European Union initiatives have mandated <0.1% Pb in imported articles and products by mid-2006. Such products include consumer products such as televisions; computer monitors, processing units and any peripheral equipment; personal music and video devices (for example, iPOD™ and similar devices); cell phones and other handheld communications devices; and any other device using a display screen or requiring glass (or glass-ceramic materials) as a sealing material. Plasma display screen devices are representative of such devices that use glass or glass-ceramic materials as sealing materials.

Plasma display panels ("PDP") and devices using plasma displays ("plasma display screen devices") offer substantial benefits in size, thinness, and viewing angle compared to, for example, current CRT (cathode ray tube) technology. As a result, major growth in these displays is occurring, and is forecasted to continue through 2010. However, concurrent with the projected display growth, there is also a growth in the number of countries improving their environment laws, and particularly their waste disposal laws. As a result, the materials that are used as seals or sealing agent must meet ever tightened environmental requirements. Currently, these displays are sealed with a number of different Pb-containing frits. Lead-containing frits offer the advantages of good flow and good adhesion at moderate sealing temperatures (450-550° C.). However, lead ("Pb") is viewed as a toxic material, both from the standpoint of workplace safety as well as the viewpoint of its being a landfill contaminant. As of 2006, the European Union through its environmental initiatives WEEE (Waste of Electrical and Electronic Equipment), and RoHS (Reduction of Hazardous Substances) is driving to restrict the allowed level of Pb in imported articles to <0.1% by mid-2006. Other regional associations or countries are discussing similar restrictions.

A frit is a powdered glass that sinters to form a structure that may incorporate features and/or elements, or may simply act as a seal or sealing agent between two materials. The plasma display device consists of two parallel glass plates separated by a precise distance and sealed around the edges. The space between the glass plates is filled with an ionizable gas or gas mixture, for example, a neon-xenon gas mixture, and phosphors (red, green and blue); and parallel electrodes are placed on each glass plate, the electrodes on one plate being orthogonal to those on the other plate. The "intersections" of the electrodes on each plate (which are separated by a precise distance) define "cells" or the individual color elements. In order for the plasma display to function, the individual cells must be separated from one another, which is typically done by inserting a honeycomb-like structure between the two plates. The interior walls of the each cell are coated with a phosphor of a single color. To produce a picture, the gas or gas mixture is ionized by the electrodes, and the ionized gases excite the phosphors which in turn glow the appropriate color. In order for the plasma display to properly operate for a long period of time, the seal created by the frit must be "fluid tight" so that ionizable gases do not escape the devices and oxygen, water vapor and other gaseous substances do not enter the chamber. Further descriptions of plasma devices can be found in U.S. patent/application Ser. Nos. 6,924,597, 2005/0245166 and 6,970,219 among other published art. Examples of lead-containing glass materials that are presently used as sealing materials can be found in an article by Kwon et al., "*Plasma display panel vacuum in-line sealing technology using a bubble-reduced frit*", J. Vac. Sci. Technol. A 21(1) (2003), pp 206-211. The Kwon article describes two lead-containing having the compositions, in weight percent, of:

(1) 89.1% PbO, 0.5% ZnO, 9.2% $B_2O_3$, 1.4% $SiO_2$, 0.2% $Fe_2O_3$, 0.04% $SnO_2$ and 0.1% BaO; and (2) 72.2% PbO, 15.0% ZnO, 9.8% $B_2O_3$, 1.9% $SiO_2$, 0.9% $SnO_2$, 0.1% BaO and 0.1% $TiO_2$.

Lead-containing sealing glasses are commercially available from, for example, Ferro Corporation, Cleveland, Ohio who supplies Pb—B, Pb—Zn—B and Pb—B—Al.

The basic requirements for a non-Pb (that is, Pb-free) sealing frit for plasma displays are that the Pb-free frits have compatible coefficients of thermal expansion (CTE, values of approximately 60-90×$10^{-7}$/° C.) for the high strain point soda-lime type glasses used in the displays, and good flow at display sealing temperature (typically in the range of 450-550° C.). This invention is directed to lead-free phosphate glass compositions that meet these basic requirements and can be used as frits. These compositions are based on tin-zinc-phosphate and alkali-zinc-phosphate glass families.

SUMMARY OF THE INVENTION

The invention is directed to lead-free glass frits compositions that can be used as sealing frits, the compositions being a blend of:

(1) at least one of two glass ("G") families generally referred to herein as the SnO—ZnO—$P_2O_5$ (tin-zinc-phosphate) and alkali-ZnO—$P_2O_5$ (alkali-zinc-phosphate) families and (2) one or more filler ("F") materials having a crystalline phase and selected from the group of beta-quartz (F1), beta-eucryptite (F2) and beta-spodumene (F3) and cordierite (F4);

bearing in mind that the foregoing can contain addition substances as may be set forth elsewhere herein. The CTE values for the frit materials based on these families are in the range of 60-90×$10^{-7}$/° C., and their sealing temperature is within the range of 450-550° C. Both the CTE values and the sealing temperature range of these frits meet plasma display seal requirements. Model seals prepared with actual PDP glasses indicate good bonding and expansion compatibility between the frits and the PDP glasses. Additional property data are presented to indicate that these materials are useful as non-Pb sealing glasses for plasma displays. Cordierite is particularly suitable for thermopane windows. The blends according to the invention have a composition, in weight percent (wt. %), of glass in the range of 65-80% and filler in the range of 35-20%, with the total equaling 100%. In one embodiment the blends have a composition, in weight percent, of glass in the range of 70-75% and filler in the range of 25-30%. The F1, F2 and F3 materials were obtained by ceramming a glass at a selected temperature for a selected time in order to obtain the appropriate crystal phase for CTE modification of the alkali-ZnO—$P_2O_5$ glass. Other methods such as the powder reaction method can also be used to prepare the filler materials. The fillers are substantially crystalline (>85% crystallite phase).

In one aspect the invention is directed to SnO—ZnO—$P_2O_5$ lead-free frit sealing materials having a glass composition, in mol %, of 25-40% $P_2O_5$, 0-10% $B_2O_3$, 1-25% ZnO, 40-70% SnO, 0-5% $Al_2O_3$, 0-1% Cl⁻ and 0-5% $WO_3$, said glass composition being blended with one or more filler materials selected from the group of beta-quartz (F1), beta-eucryptite (F2), beta-spodumene (F3) and cordierite.

In one aspect the invention is directed to SnO—ZnO—$P_2O_5$ lead-free frit sealing materials having a glass composition, in mol %, of 30-35% $P_2O_5$, 1-3% $B_2O_3$, 3-6% ZnO, 57-63% SnO, 0-2% $Al_2O_3$, and 0-1% $WO_3$; said glass composition being blended with at least one filler material having a crystalline phase selected from the group consisting of beta-quartz, beta-eucryptite, cordierite, and beta-spodumene.

In another aspect the invention is directed to alkali-ZnO—$P_2O_5$ glass lead-free frit sealing materials having a glass composition, in mol %, of 28-40% $P_2O_5$, 30-40% ZnO, 0-10% $Li_2O$, 0-15% $Na_2O$, 0-15% $K_2O$, 5-30% ($Li_2O+Na_2O+K_2O$), 0-3% $Al_2O_3$, 0-10% $B_2O_3$, 0-5% $WO_3$ and 0-5% $MoO_3$, said glass compositions being blended with at least one filler material having a crystalline phase selected from the group consisting of beta-quartz, beta-eucryptite, cordierite, and beta-spodumene.

In another aspect the invention is directed to alkali-ZnO—$P_2O_5$ glass lead-free frit sealing materials having a glass composition, in mol %, of 33-40% $P_2O_5$, 31-38% ZnO, 4-6% $Li_2O$, 8-12% $Na_2O$, 4-9% $K_2O$, 0.5-1.5% $Al_2O_3$, 2-5% $B_2O_3$, 1-3% $WO_3$ and 1-3% $MoO_3$; said glass composition being blended with at least one filler material having a crystalline phase selected from the group consisting of beta-quartz, beta-eucryptite, cordierite, and beta-spodumene.

DETAILED DESCRIPTION OF THE INVENTION

Figure 1:
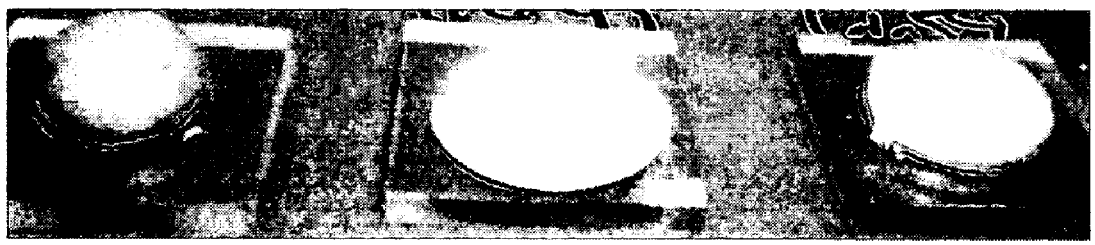
FIG. 1 is an oblique view of flow buttons of SnO—ZnO—$P_2O_5$ glass plus filler blends after heating at 530° C. for 30 minutes.

As used herein, the term "PDP", which stands for "plasma display panel" is used for exemplary purposes and is meant to include not only devices using plasma display panels, but also devices using other types of displays and articles (for example, LCD, thermopane windows) that require use glass and require sealing materials having CTE values and flow sealing temperatures or characteristics of the compositions described herein. With reference to the examples, tables and figures, specific glass compositions are represented by the capital letter "G" plus numeral, specific fillers are represented by the capital letter "F" plus a numeral, and blends are represented by the capital letter "B" plus a numeral. Filler materials can be prepared by any method known in the art.

The invention is directed to lead-free sealing frits comprised of (1) a selected filler material having a composition and a crystalline phase as described herein, and (2) a SnO—ZnO—$P_2O_5$ or an alkali-ZnO—$P_2O_5$ glass material having a composition as described herein. These lead-free frits of the invention have a CTE and sealing temperature compatible with the high-strain point glasses used for plasma display panels Several compositions of lead-free sealing frits for plasma and other displays are presented. These frits materials are blends of (1) glasses selected from the families: Tin-Zinc-Phosphate (SnO—ZnO—$P_2O_5$) glasses and Alkali-Zinc-Phosphate (alkali-ZnO—$P_2O_5$) glasses; and (2) crystalline fillers with low CTEs selected from the group of beta-quartz, beta-eucryptite, beta-spodumene and cordierite. The CTE values for these lead-free blends are in the range of 60-90×$10^{-7}$/° C., and the blends have flow characteristics that enable them to be used at sealing temperatures in the range of 450-550° C. As a result, the frit materials of the invention meet both plasma display seal requirements. Model seals have been prepared using commercial PDP glasses, and the test results indicate good bonding and expansion compatibility between the frits and the PDP glasses.

Tin-Zinc-Phosphate (SnO—ZnO—$P_2O_5$) Glass Compositions

The tin-zinc-phosphate (SnO—ZnO—$P_2O_5$) glass compositions of the invention comprise a SnO—ZnO—$P_2O_5$ glass having a composition, in mol %, in the range of 25-40% $P_2O_5$, 0-10% $B_2O_3$, 1-25% ZnO, 50-70% SnO, 0-5% $Al_2O_3$, 0-1% $Cl^{-1}$, and 0-5% $WO_3$, said glass composition being blended one or more filler materials with the indicated crystalline phases selected from the group of beta-quartz (F1), beta-eucryptite (F2) and beta-spodumene (F3) crystalline phase containing materials. The filler materials may also contain additional components; for example, ZnO, $LiO_2$, MgO, and others metal oxides. For example, an exemplary beta-quartz filler with other components can contain $0\% \leq ZnO \leq 17\%$ and $0\% \leq Li_2O \leq 12\%$ (molar basis). In another example the beta-quartz filler can contain $10\% \leq ZnO \leq 15\%$ and $5\% \leq Li_2O \leq 10\%$. Cordierite (F4) can also be used as a filler material. Corderite has the specific formula $Mg_2Al_4Si_5O_{18}$.

To exemplify the invention two SnO—ZnO—$P_2O_5$ glass compositions and three filler compositions, both in mol %, which meet the PDP lead-free frit specifications are shown in Table 1. The first two compositions, G1 and G2, are the SnO—ZnO—$P_2O_5$ glasses and the last three compositions, F1-F3, are the fillers used with these glasses to make frit blends. All materials, glass or filler, are prepared using standard starting materials known in the art, for example, without limitation, the oxides, nitrates and carbonates of the elements shown in Table 1 (P, W, Sn, Zn, etc.), and are present in the glasses, fillers and blends as their oxides are also shown in Table 1. The G1 and G2 glasses were prepared by melting in a dry environment at 1000° C. for 2 hours. After melting, the glass is made into rolled ribbon using method known in the art. As-batched (not analyzed) compositions are shown in Table 1.

TABLE 1

Composition of exemplary glass and filler compositions in mol %

| | Sample Numbers | | | | |
|---|---|---|---|---|---|
| Oxide | G1 | G2 | F1 (Beta Quartz) | F2 (Beta Eucryptite) | F3 (Beta Spodumene) |
| $P_2O_5$ | 34.0 | 31.0 | — | — | — |
| $B_2O_3$ | 1.8 | 2.0 | — | — | — |
| ZnO | 3.0 | 6.0 | 12.5 | — | — |
| $SnO_2$ | 60.0 | 60.0 | — | — | — |
| $Al_2O_3$ | 0.0 | 1.0 | — | — | — |
| $WO_3$ | 0.5 | — | — | — | — |
| $SiO_2$ | — | — | 59.5 | 50 | 75.3 |
| $Li_2O$ | — | — | 6.8 | 25 | 10.5 |
| $Al_2O_3$ | — | — | 19.5 | 25 | 14.2 |
| $ZrO_2$ | — | — | 2.2 | — | — |

The fillers were prepared at the temperatures and times necessary to obtain the appropriate crystal phase necessary for CTE modification in the blend. The filler materials are substantially fully crystalline (>85% crystalline).

After being drawn into ribbons, the glasses G1 and G2 were coarse ground and then balled milled under dry conditions. The glass was then ball milled in a dry atmosphere and sieved to several different particle size ranges to establish which particle size range, of combination of ranges, produce a frit materials having the best flow characteristics. The filler materials were ground and sieved in a similar manner. The particle size data for G1, G2 and F1-F3 shown below in Table 2.

TABLE 2

Particle size data for glasses and fillers

| Glass/Filler (Mesh Size) | $d_{10}$ 10% (μm) | $d_{50}$ 50% (μm) | $d_{90}$ 90% (μm) |
|---|---|---|---|
| G2 (10-15 μm/−325 mesh) | 2-5 | 5-10 | 20-30 |
| G1 (10-15 μm/−325 mesh) | 5-10 | 10-15 | 25-35 |
| G1 (20-30 μm/−200 mesh) | 10-15 | 25-35 | 50-60 |
| F2 (15-20 μm/−325 mesh) | 5-10 | 12-18 | 30-40 |
| F1 (10-15 μm/−325 mesh) | 1-5 | 10-15 | 40-50 |
| F3 (20-25 μm/−200 mesh) | — | 20-30 | — |

Table 2 shows the particle size at $d_{10}$, $d_{50}$ and $d_{90}$ for both the glasses and the fillers used in each blend. The $d_{10}$ value means that 10% of the particles are smaller than the range given for this column, $d_{50}$ means that 50% of the particles are smaller than the range given in this column and $d_{90}$ means that 90% of the particles are smaller than the range given in this column. Table 3 illustrates three frit blend compositions B1-B3 according to the invention that were tested and found suitable for lead-free PDP sealing along with the particle size distribution for each of the blends at $d_{10}$, $d_{50}$ and $d_{90}$.

TABLE 3

Frit blend compositions, in weight %.

| | Samples | | |
|---|---|---|---|
| Blend Components | B1 | B2 | B3 |
| G1 (10-15 um/−325 mesh) | — | — | 75 |
| G1 (20-30 μm/−200 mesh) | — | 75 | — |
| G2 (10-15 μm/−325 mesh) | 75 | — | — |
| F2 (15-20 um/−325 mesh) | 25 | — | — |
| F3 (20-25 um/−200 mesh) | — | 25 | — |
| F1 (10-15 um/−325 mesh) cerammed | — | — | 25 |

Thermal expansion coefficient (CTE), onset $T_g$, softening point, particle size distribution and flow were measured on each of the blends shown in Table 2. Flow buttons were made from each blend and fired at several different temperatures to show the flow behavior of each blend based on particle size and temperature.

For evaluating the frit compositions of the invention, small cylindrical pellets ("flow buttons") were prepared and fired to different temperatures to evaluate flow. Typically, 1.0-2.0 gm of material was placed inside a stainless steel mold (inside diameter 12.7 mm) and hand-pressure was used to compact the pellet. Expansion compatibility between various blends and plasma display glass was measured polarimetrically using butt seals (a fired frit coating applied to one face of a 10 mm wide×20 mm long×0.5-1.0 mm thick glass plate) and inverse sandwich seals (two glass plates of the same dimension as the butt seal plates placed face-to-face with a thin coating of fired frit material between the plates). The frit was made into a paste using amyl acetate/nitrocellulose as the vehicle/binder, was applied to the respective surfaces and fired. The optical retardation was measured with a polarimeter, and then the total expansion difference between the frit and glass plate was calculated.

Figure 2:
FIG. 2 is a top view of flow buttons of SnO—ZnO—$P_2O_5$ glass plus filler blends after heating at 530° C. for 30 minutes.

The glass transition temperature was measured using a Seiko DSC (Differential Scanning Calorimetry) 220° C. instrument. The sensitivity on this instrument is from +100 uW to +100 mW. The heating rate used for evaluating the samples was 10° C./min, from room temperature (approximately 18-25° C.) to 600° C. The onset definition of $T_g$ was used to obtain this data and the experimental error in calculating $T_g$ is ±4° C. FIGS. 1 and 2 illustrate oblique and top views of the flow buttons for blends B1, B2 and B3 after firing in a furnace at 530° C. for 30 minutes.

Particle size analysis was performed using a Microtrac S3500 particle size analyzer. This instrument has a measuring range of 0.024 to 2800 microns. The S3500 instrument utilizes a tri-laser technology to provide more accurate measurements as well as Mie scattering calculations for non-spherical particles.

Expansion mismatch of the frit blends to a commercial plasma display glass were made using an inverse sandwich seal and a butt seal formation. The inverse sandwich seal is a frit layer sandwiched between two pieces of a PDP glass having a high strain point and a high CTE. The butt seal is a frit layer on top of one sheet of the same glass. The seals were fired at 530° C. for 15 minutes. The samples were then measured for room temperature mismatch to determine the mismatch strain of the seal in ppm (parts per million).

Figure 3:
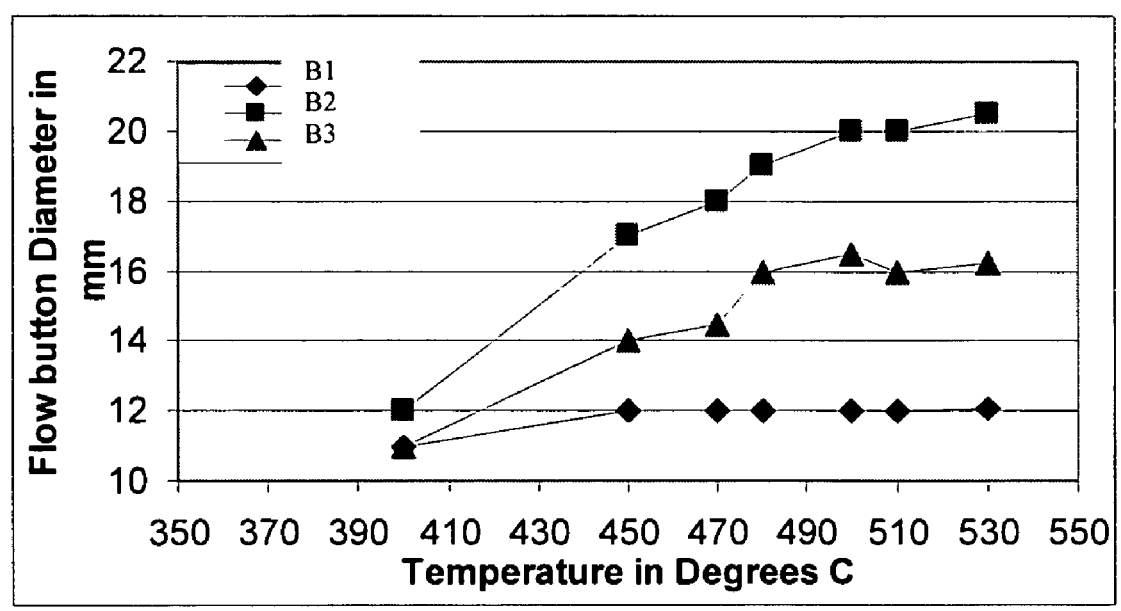
FIG. 3 is a graph of flow button diameter versus sintering temperature for flow buttons of SnO—ZnO—$P_2O_5$ glass plus filler.

The frit composition B3 was selected as the best fit for the above glass application based on flow during sintering. FIGS. 1 and 2 illustrate flow characteristics for the three frit blends at the different particle sizes. Blend B1 has the least amount of flow and blend B2 has the most amount of flow. FIG. 3 illustrates flow button diameter as a function of temperature for blends B1, B2 and B3. Taken together, Table 3 and FIGS. 1-3 indicate both frit composition and particle size need to be considered in selecting a blend for PDP frit flow requirements.

Table 4 shows the room temperature mismatch data for blends B2 and B3 with the PDP glass. The mismatch results are very good. Room temperature mismatch was approximately +50 ppm, indicating that the frit is in very mild tension. While no mismatch results were obtained for blend B1, the CTE for was measured to be $74.1 \times 10^{-7}/°$ C., over the range 25-400° C. The measured frit CTE suggests a good expansion match to the PDP glass which has a CTE between 70 and $80 \times 10^{-7}/°$ C.

TABLE 4

Room temperature mismatch results on PDP glass

|  | B2 | B3 |
|---|---|---|
| RT mismatch | +39 ppm | +98 ppm |
| (butt seals), in ppm | +38 ppm | +104 ppm |
| RT mismatch | +127 ppm | +66 ppm |
| (inverse sandwich), | +205 ppm | +25 ppm |
| in ppm |  |  |

Experimental results indicate that blend B2 has the best flow at a sealing temperature of 530° C., a temperature within the sealing range of 450-550° C. All three candidates were shown to have good mismatch to the plasma display glass or a CTE that is within the specifications for this application.

Alkali-Zinc-Phosphate (Alkali-ZnO—$P_2O_5$) Glass Compositions

Exemplary alkali-zinc-phosphate glass compositions (in mol %) according to the invention that are suitable for making frit blends for PDP applications are shown in Table 5 as glasses G3 and G4. The exemplary glasses G3 and G4 were melted in silica crucibles for a time in the range of 1-2 hours at a temperature of 1000±30° C. The melts are coarse ground and ball milled and sieved as described above in Section I. The fillers F1, F2 and F3 are as described above.

TABLE 5

Composition of an Alkali-ZnO—$P_2O_5$ glasses (in mol %).

| Oxide | G3 | G4 | G5 | G6 | G7 |
|---|---|---|---|---|---|
| $P_2O_5$ | 36.0 | 37.0 | 34.0 | 32.3 | 29.7 |
| ZnO | 35.0 | 34.0 | 36.1 | 36.6 | 38.5 |
| $Li_2O$ | 5.0 | 5.0 | 5.2 | 5.4 | 5.55 |
| $Na_2O$ | 10.0 | 10.0 | 10.3 | 10.8 | 11.0 |
| $K_2O$ | 5.0 | 7.0 | 5.2 | 5.4 | 5.5 |
| $Al_2O_3$ | 1.0 | 1.0 | 1.0 | 1.1 | 1.1 |
| $B_2O_3$ | 4.0 | 3.0 | 4.1 | 4.3 | 4.45 |
| $WO_3$ | 2.0 | 1.5. | 2.2 | 2.20 | 2.28 |
| $MoO_3$ | 2.0 | 1.5 | 2.1 | 2.2 | 2.2 |

Table 6 shows the particle size distributions for the $d_{10}$, $d_{50}$ and $d_{90}$, of two compositions within the alkali-zinc-phosphate glass family that can be used as non-lead seals for plasma displays. Frits blends made of G3 or G4 with F1 that are suitable for PDP use, as their associated particle size data are given in Table 7, (in weight % (wt. %)). Blends B4 -B9 shown in Table 7 are of varying percent composition were made using G3 and G4 glass powders and the filler F1.

TABLE 6

Particle size data for of G3 and G4 glasses.

| Sample ID | 10% (μm) | 50% (μm) | 90% (μm) |
|---|---|---|---|
| G3 | 1-5 | 7-12 | 20-25 |
| G4 | 2-8 | 10-15 | 32-36 |
| G5-G7 |  | Not analyzed |  |

TABLE 7

F1 + (G3 or G4) frit blends

| Blends | G3:F1 | G4:F1 |
|---|---|---|
| B4 | 65:35 | — |
| B5 | 70:30 | — |
| B6 | 75:25 | — |
| B7 | — | 65:35 |
| B8 | — | 70:30 |
| B9 | — | 75:25 |

Table 8 lists the composition of blends B10-B18 which were made using glass G3 and fillers F1, F2 or F3.

TABLE 8

G3 + (F1, F2 or F3) frit blends

| Blends | G3:F1 | G3:F3 | G3:F2 |
|---|---|---|---|
| B10 | 60:40 | — | — |
| B11 | — | 75:25 | — |
| B12 | — | 70:30 | — |
| B13 | — | 65:35 | — |
| B14 | — | 60:40 | — |
| B15 | — | — | 75:25 |
| B16 | — | — | 70:30 |
| B17 | — | — | 65:35 |
| B18 | — | — | 60:40 |

Figure 4:
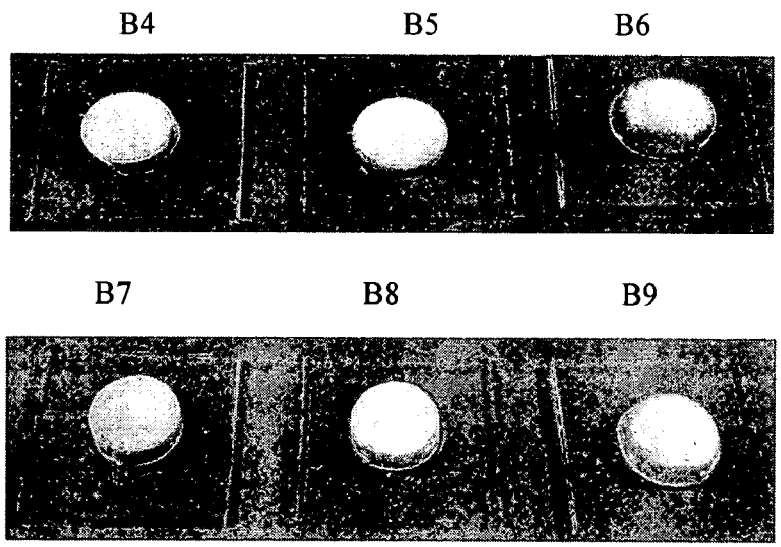
FIG. 4 is an oblique view of six different flow buttons of alkali-ZnO—$P_2O_5$ glass plus filler blends after heating at 530° C. for 30 minutes.

Flow buttons made using alkali-zinc-phosphate frit blends B4-B9 were pressed with 1 g of the blends (with a few drops of isopropanol added for adhesion purposes), and then fired on the same commercial PDP substrate glass described above. The sintering was carried out at 400, 450, 475, 500, and 530° C. for 0.5 hour. Flow buttons of the base glass were made in the same way with the firing schedule of 450° C. for 0.5 hour. FIG. 4 illustrates some of the alkali-zinc-phosphate glasses suitable for use as PDP seals. Flow button tests of blends made with each of G3 and G4 showed that the most flow was achieved with the least filler added, as expected.

Figure 5:
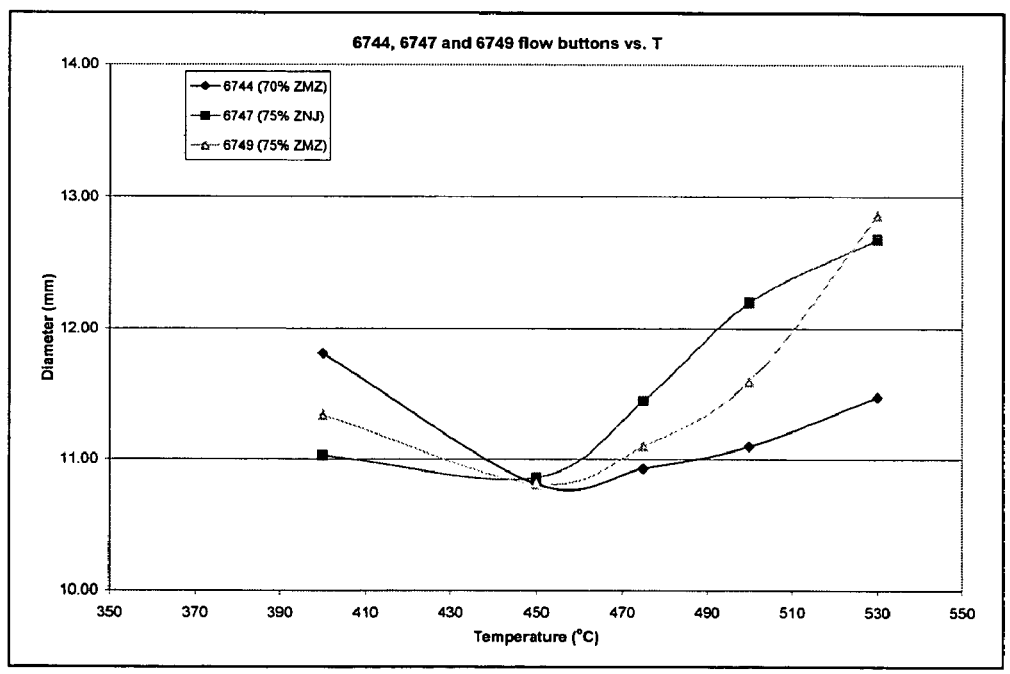
FIG. 5 is a graph of flow button diameter versus sintering temperature for flow buttons of alkali-ZnO—$P_2O_5$ glass plus filler.

The temperature dependence of the diameter of flow buttons made using blends B5, B6 and B9 is shown in FIG. 5. One can see that above T=450° C., flow increases with temperature as is expected. The initial diameter decrease was observed below 450° C. and is due to initial frit shrinkage. To test melt reproducibility and effect of crucible type on durability, remelts of these materials were done in both silica and platinum crucibles at the same schedule. The remelts were ball milled to the specification of 10-15 μm/−325 mesh.

Butt and inverse sandwich seals were also prepared on PDP glass substrate. Amyl acetate was added to a sample of the blends to give a paste which was spread onto the substrate. A second piece of substrate glass was placed on top of the paste for the inverse sandwich seals. The same firing schedule as noted previously was used for the base glass samples with the blend samples fired at 530° C. for 0.5 hour. The edges were cleaned after the paste had completely dried to allow for mismatch readings to be taken after firing. The thickness of the paste was measured after firing.

Figure 6:
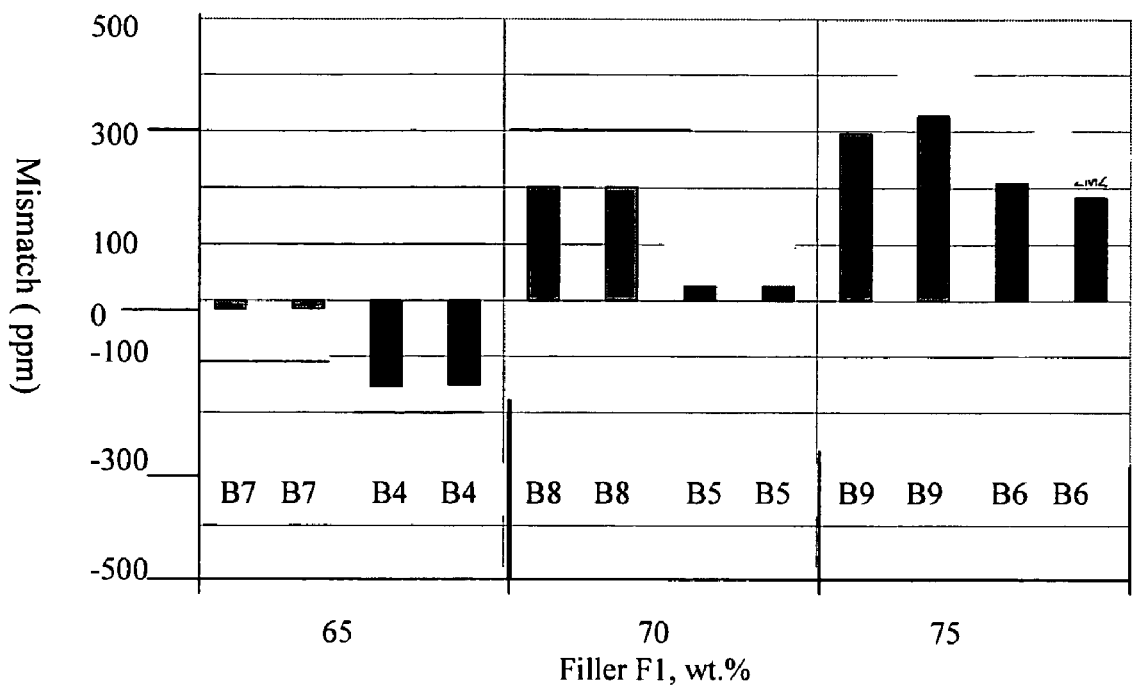
FIG. 6 is a plot of mismatch in ppm vs. wt. % filler for butt seals data made using the indicated blends of filler F1 with glasses G3 and G4 at various percentages of filler.
Figure 7:
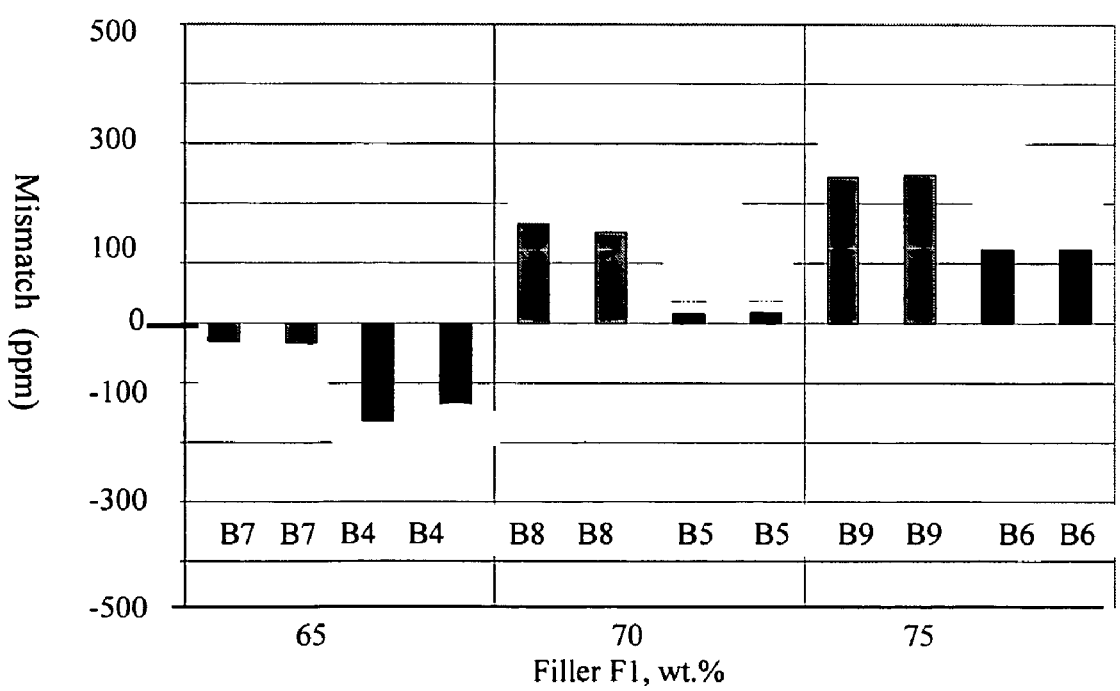
FIG. 7 is a plot of mismatch in ppm vs. wt. % filler for inverse sandwich seals made using the indicated blends of filler F1 with glasses G3 and G4 at various percentages of filler.
Figure 8:
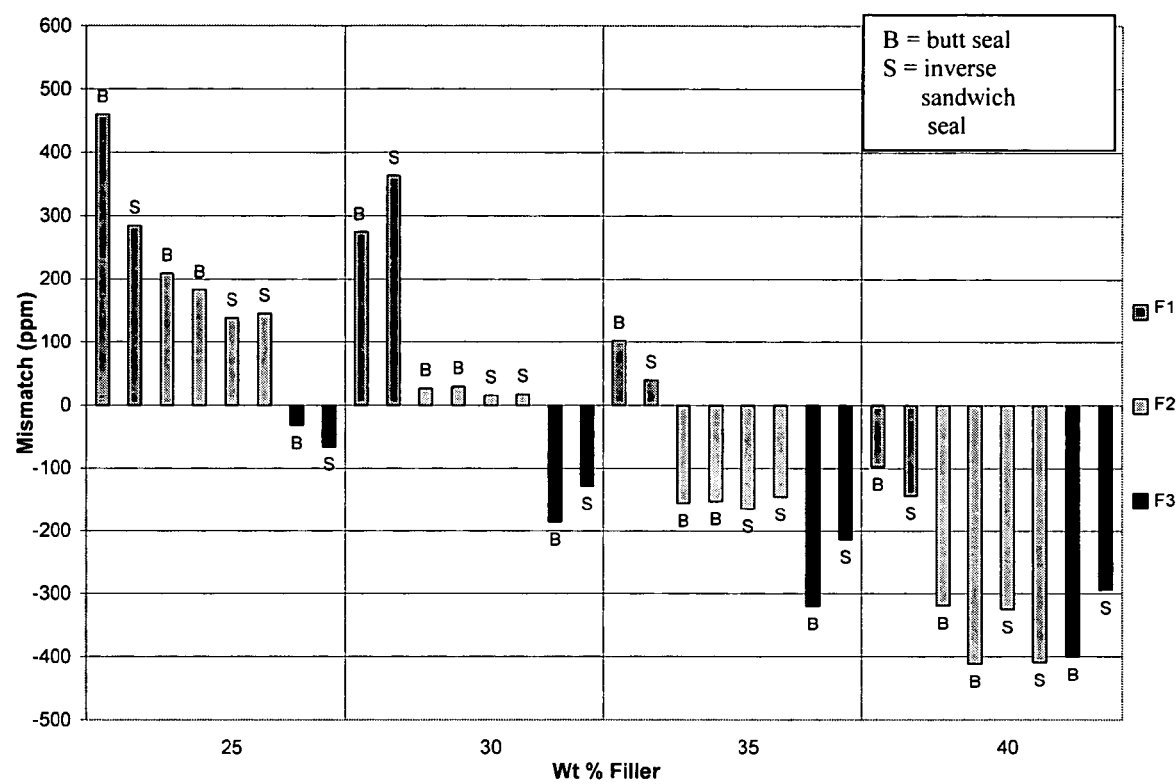
FIG. 8 is a plot of both butt seal and inverse sandwich data for selected frit blends made using glass G3 and fillers F1-F3.

FIG. 6 presents butt seal data for the indicated G3 and G4 frit blends in the order, left to right, B7, B7, B4, B4, B8, B8, B5, B5, B9, B9, B6 and B6. FIG. 7 represents inverse sandwich seal data of the same frit blends in the same order, left to right. The mismatch data of FIGS. 6 and 7 indicate that the most preferred mismatch results (that is, neutral or frit in slight compression) is achieved for blends having a 70:30 glass to filler ratio. However, since the frit must also exhibit flow for sealing, the best combination of flow and mismatch appears to be at a 75:25 glass-to-filler ratio, especially with blends B6 and B9. FIG. 8 is a plot of both butt seal ("B") and inverse sandwich seal ("S") mismatch data for selected frit blends made using glass G3 and fillers F1-F3. In each column the filler material, from left to right, is: F3, F3, F1, F1, F1, F1, F2, F2.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

We claim:

1. A lead-free frit seal material comprising a blend of:
   (a) 65-85 weight % of a SnO—ZnO—$P_2O_5$ glass comprising, in mol %, in the range of 25-40% $P_2O_5$, 0-10% $B_2O_3$, 1-25% ZnO, 50-70% SnO, 0-5% $Al_2O_3$, 0-1% $Cl^{-1}$, and 0-5% $WO_3$; and
   (b) 20-35 weight % of a filler material having a crystalline phase comprising beta-quartz.

2. The frit sealing material blends according to claim 1, wherein said blends has a CTE value in the range of 60-90× $10^{-7}$/° C.

3. The frit sealing material blend according to claim 1, wherein said blend has a composition, in weight percent, of glass in the range of 70-75% and filler in the range of 25-30%.

4. The frit sealing material blend according to claim 1, wherein after said lead-free frit sealing material is used to seal a display glass, the mismatch value between the display glass and the frit material is less than 300 ppm for the frit.

5. The frit sealing material blends according to claim 4, wherein the mismatch value is less than 100 ppm for the frit.

6. The frit sealing material blend according to claim 1, wherein said blend has a particle size distribution $d_{90}$ of 90% of particles being 50 μm or smaller.

7. A lead-free frit sealing material blend, said blend comprising 65-85 weight % of:
   a SnO—ZnO—$P_2O_5$ glass having a composition, in mol %, of 30-35% $P_2O_5$, 1-3% $B_2O_3$, 3-6% ZnO, 57-63% SnO, 0-2% $Al_2O_3$, 0-1% $Cl^{-1}$, and 0-1% $WO_3$; and 20-35 weight % of
   a filler material having a crystalline phase comprising of beta-quartz.

8. The frit sealing material blend according to claim 7, wherein said blend has a CTE value in the range of 60-90× $10^{-7}$/° C.

9. The frit sealing material blend according to claim 7, wherein said blend has a composition, in weight percent, of glass in the range of 70-75% and filler in the range of 25-30%.

10. A lead-free frit sealing material blend comprising:
    a SnO—ZnO—$P_2O_5$ glass having a composition, in mol %, of 30-35% $P_2O_5$, 1-3% $B_2O_3$, 3-6% ZnO, 57-63% SnO, 0-2% $Al_2O_3$, 0-1% $Cl^{-1}$, and 0-1% $WO_3$; and
    a filler material having a crystalline phase, wherein the filler is a beta-quartz containing filler additionally containing 10%≦ZnO≦15% and 5%≦$Li_2O$≦10%.

11. The lead-free frit seal material of claim 1, wherein the filler material further comprises ZnO in a range from 0 mol % to 17 mol % and $Li_2O$ in a range from 0 mol % to 12 mol %.

* * * * *